(12) United States Patent
Nemer

(10) Patent No.: US 7,463,679 B2
(45) Date of Patent: Dec. 9, 2008

(54) EQUALIZER MODE SELECTION BASED ON DISTRIBUTION OF SYMBOL ERROR

(75) Inventor: Elias Nemer, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 590 days.

(21) Appl. No.: 11/168,897

(22) Filed: Jun. 27, 2005

(65) Prior Publication Data

US 2006/0291553 A1 Dec. 28, 2006

(51) Int. Cl.
*H03H 7/30* (2006.01)
(52) U.S. Cl. ..................................... 375/232
(58) Field of Classification Search ......... 375/229–234, 375/350
See application file for complete search history.

(56) References Cited

U.S. PATENT DOCUMENTS

| 5,182,749 | A | * | 1/1993 | Kazecki et al. | 370/498 |
| 5,502,506 | A | * | 3/1996 | Choi | 348/607 |
| 5,638,400 | A | * | 6/1997 | Yaguchi | 375/232 |
| 6,215,818 | B1 | | 4/2001 | Velez et al. | |
| 7,110,449 | B2 | * | 9/2006 | Heo et al. | 375/233 |
| 7,158,568 | B2 | * | 1/2007 | Park et al. | 375/233 |
| 2003/0227968 | A1 | * | 12/2003 | Kim et al. | 375/233 |
| 2004/0001538 | A1 | | 1/2004 | Garrett | |
| 2005/0243908 | A1 | * | 11/2005 | Heo et al. | 375/233 |
| 2005/0254568 | A1 | * | 11/2005 | Markman et al. | 375/233 |

FOREIGN PATENT DOCUMENTS

WO WO 03/090350 A1 10/2003
WO WO 2004/091127 A2 10/2004

OTHER PUBLICATIONS

McGinty, Negel, "Strategy to Transition From the Constant Modulus Algorithm to a Decision Feedback Blind Equalizer", Institute of Electrical and Electronics Engineers, 2002 IEEE International Conference on Acoustics, Speech, and Signal Processing (ICASSP). Orlando, FL, May 13-17, 2002. IEEE International Conference on Acuoustics, Speech, and Signal Processing (ICASSP), New York, NY: IEEE, US. vol. 4 of 4, May 13, 2002, pp. III-2661-III-2664, XP010802947, ISBN: 0-7803-7402-9.

(Continued)

*Primary Examiner*—Khanh C Tran
(74) *Attorney, Agent, or Firm*—Buckley, Maschoff & Talwalkar LLC

(57) ABSTRACT

According to some embodiments, an equalizer receives a signal and generates symbols based on the received signal. Moreover, a controller may be provided to determine a mode of equalizer operation based at least in part on a distribution of error associated with the symbols.

22 Claims, 11 Drawing Sheets

OTHER PUBLICATIONS

Labat, J. et al., " Blind Spatio-Temporal Decision Feedback Equalization: A Self-Adaptive Approach", Global Telecommunications Conference—Globecom '99, vol. 5, Dec. 5, 1999, pp. 2301-2305, XP010373364.

Young-Jo Lee et al., "A Decision-Directed Blind Equalization with the Error Variance Estimation", 1997 IEEE 6th. International Conference on Universal Personal Connunications Record. San Diego, Oct. 12-16, 1997, IEEE International Conference on Universal Personal Communications, New York, IEEE, US, vol. 2 Conf. 6, Oct. 12, 1997, pp. 99-103, EP010248678, ISBN: 0-7803-3777-8.

Hatzinakos, Dimitrios et al., "Blind Equalization Using a Tricepstrum-Based Algorithm", IEEE Transactions on Communications, IEEE Service Center, Piscataway, NJ, US. vol. 39, No. 5, May 1, 1991, pp. 669-682, XP000259006, ISSN: 0090-6778.

Nikias, Chrysostomos L. et al., "Signal Processing with Higher-Order Spectra", IEEE Signal Processing Magazine USA, vol. 10, No. 3, Jul. 1993, pp. 10-37, XP002428651, ISSN: 1053-5888.

Elias Nemer, "Effective Multi-Mode Equalization for ATSC Receivers", Consumer Communications and Networking Conference, 2006. CCNC 2006. 2003 3rd IEEE Las Vegas, NV, USA Jan. 8-10, 2006, Piscataway, NJ, USA, IEEE, 2006, pp. 854-858, XP008077267, ISBN: 1-4244-0085-6.

Tugnait, J.K. et al., "Single-User Channel Estimation and Equalization", IEEE Signal Processing Magazine IEEE USA, vol. 17, No. 3, May 2000, pp. 17-28, XP002428650. ISSN: 1053-5888.

"PCT International Search Report of the International Searching Authority", mailed Apr. 24, 2007, fpr PCT/US2006/025224, 5pgs.

* cited by examiner

US 7,463,679 B2

EQUALIZER MODE SELECTION BASED ON DISTRIBUTION OF SYMBOL ERROR

BACKGROUND

An apparatus may generate symbols based on a received signal. For example, a receiver might receive a digital television signal and generate symbols that can be used to create an image for a viewer. In some cases, a filter may improve the performance of the receiver. For example, the filter may help the receiver generate correct symbols even when the received signal includes a substantial amount of noise and/or echoes.

DETAILED DESCRIPTION

Figure 1:
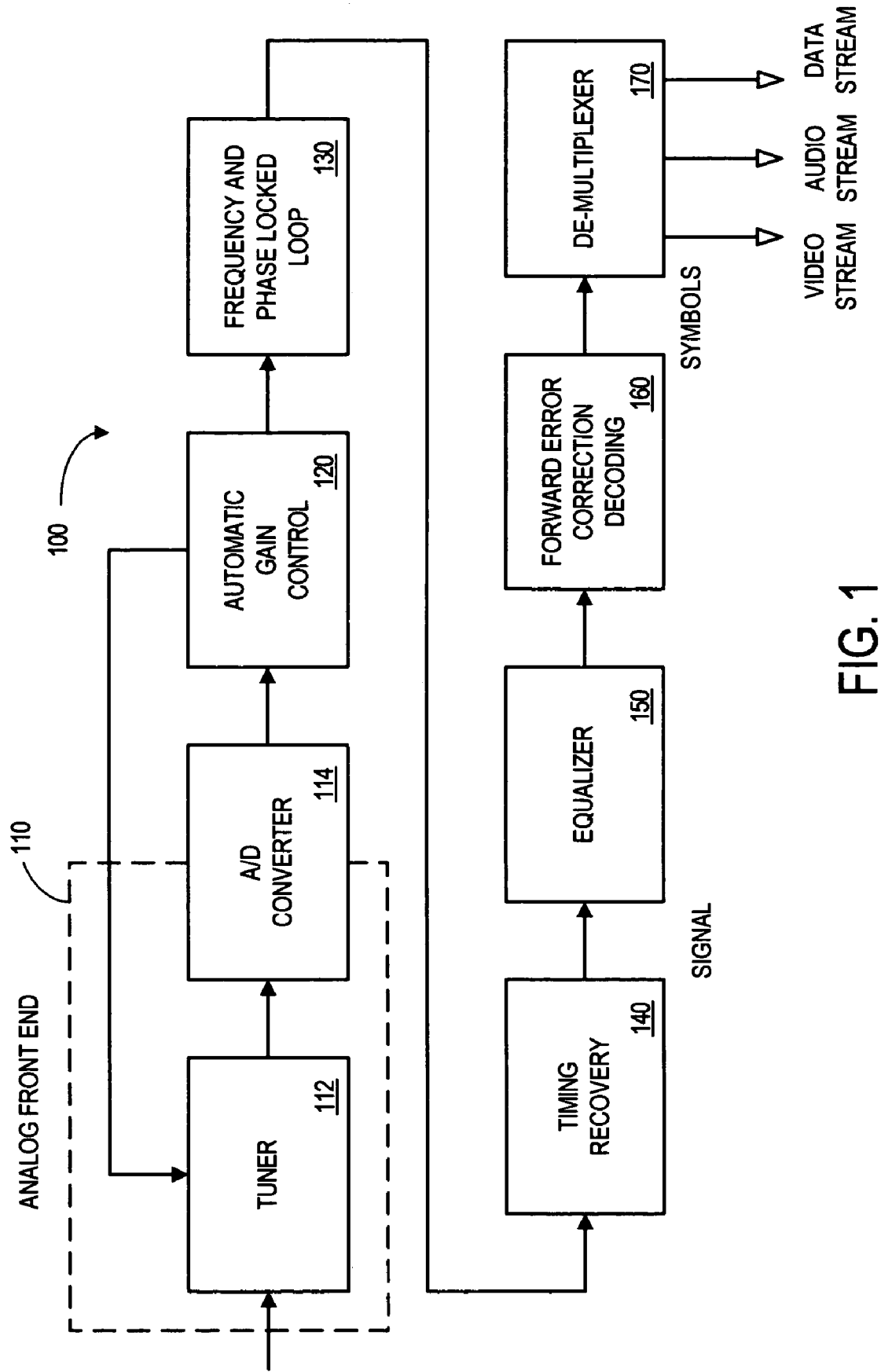
FIG. 1 is a block diagram of an apparatus according to some embodiments.

FIG. 1 is a block diagram of an apparatus 100 that receives a signal according to some embodiments. The apparatus 100 might comprise, for example, a receiver that receives a digital television signal associated with the Advanced Television Systems Committee (ATSC) standard A/53C, Rev. C (2004). The apparatus 100 might be associated with, for example, a television, a set-top box, a Digital Video Recorder (DVR), or a media center.

According to some embodiments, an analog front end 110 of the apparatus 100 receives a terrestrial digital video signal that is being broadcast through the atmosphere. In this case, the received signal may include a significant amount of noise and/or echoes, such as those described in ATSC document number 99-04A entitled "Evaluation of ATSC 8-Reciver Performance in the Presence of Simulated Multipaths and Noise" (1999). According to some embodiments, the apparatus 100 is associated with a Vestigial Side Band (VSB) receiver. The analog front end 110 might, for example, include a tuner 112 to receive the digital video signal and to provide an output to an Analog-to-Digital (A/D) converter 114. The A/D converter 114 might, for example, use digital sampling to convert a 44 MegaHertz (MHz) analog signal into an appropriate digital representation of that signal. An Automatic Gain Control (AGC) circuit 120 may receive the digital signal and provide information to the tuner 112 to help ensure that signals are maintained at appropriate levels.

A Frequency and Phase Locked Loop (FPLL) circuit 130 and a timing recovery circuit 140 (e.g., for symbol synchronization) may be used to generate a signal that is processed by an equalizer 150 and a Forward Error Correction (FEC) decoding circuit 160 to help generate correct symbols even when multipaths are present in the signal (e.g., due to echoes that occurred while the terrestrial digital signal traveled through the atmosphere). The symbols may then be processed by a de-multiplexer 170 to generate a video stream, an audio stream, and/or a data stream that may be used to provide information to a viewer.

Figure 2:
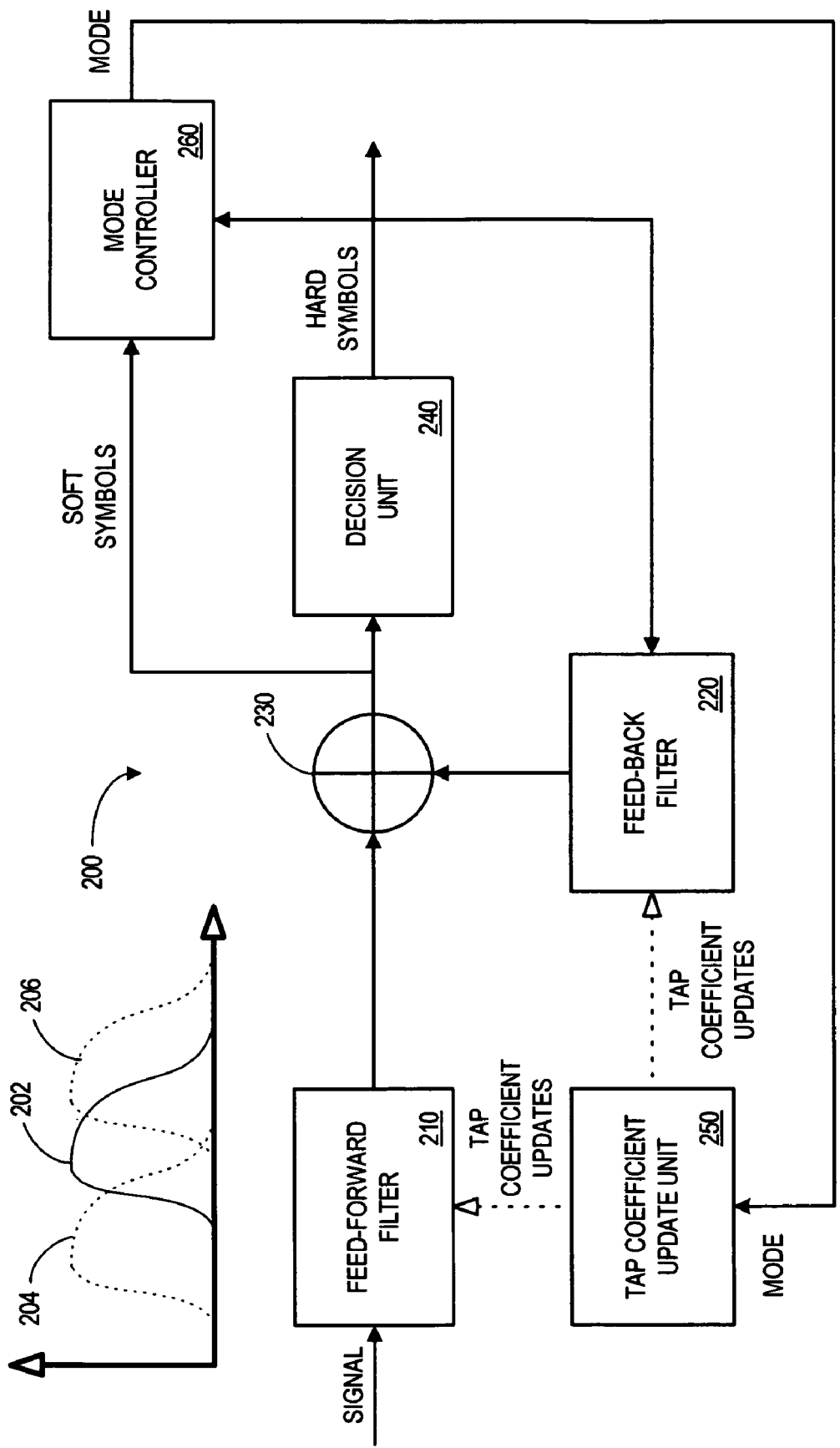
FIG. 2 is a block diagram of an equalizer according to some embodiments.

FIG. 2 is a block diagram of an equalizer 200 according to some embodiments. The equalizer 200 may receive a signal associated with a current symbol 202 that was broadcast through the atmosphere. In some cases, the received signal will be degraded because of a previous symbol 204 and/or a subsequent symbol 206. One function of the equalizer 200 may be to generate a correct "hard" symbol even when such Inter-Symbol Interference (ISI) is present.

To reduce the interference of the next symbol's rising edge (e.g., pre-cursor ISI), the equalizer 200 may include a multi-tap feed-forward filter 210. Each tap of the feed-forward filter 210 may be associated with a coefficient that adjusts the received signal. These coefficients can then be updated by a tap coefficient update unit 250 to improve the performance of the equalizer 200.

Similarly, the equalizer 200 may include a feed-back filter 220 to reduce interference created by the previous symbol's falling tail (e.g., post-cursor ISI), and each tap of the feed-back filter 220 may be associated with a coefficient that can be updated by a tap coefficient update unit 250. In particular, the output of the feed-forward filter 210 may be added to the output of the feed-back filter 220 (e.g., via adder 230) and the resulting "soft" symbol may be provided to a decision unit 240 that generates a "hard" symbol based on the soft symbol. For example, when a soft symbol of "5.3" is received by the decision unit 240, it might be determined that "5" is the appropriate hard symbol when an 8-VSB constellation is used as recommended by the ATSC document number A/54B entitled "Recommended Practice: Guide to the Use of the ATSC Digital Television Standard" (2003). Although the feed-back filter 220 is shown in FIG. 2 as receiving hard symbols, note that the feed-back filter 220 might, according to some embodiments, receive soft symbols or synchronization information depending on a mode of equalizer 200 operation.

The equalizer 200 may operate in different modes, and each mode may use a different algorithm to update tap coefficients. For example, the equalizer 200 might operate in a first mode until sufficient information about the received signal has been determined (e.g., the signal has at least partially "converged"). After sufficient information about the received signal has been determined, the equalizer 200 might switch to another mode that uses this information to better adjust the tap coefficients.

A mode controller 260 may select the appropriate mode of operation based on the soft and hard symbols. For example, the mode controller 260 might change the mode of operation based on a difference between the soft and hard symbols (e.g., a magnitude of "error"). However, such an approach may not be reliable in a high-noise environment (e.g., because the error might be too high even when convergence occurs). As another approach, the mode controller 260 might use a Sato or Goddard blind statistical error to determine when the mode should be changed. Although the average of these blind errors might become close to zero when convergence occurs, their instantaneous values may remain fairly large. Moreover, attempting to use long-term averages of these value may not be convenient or effective.

Figure 3:
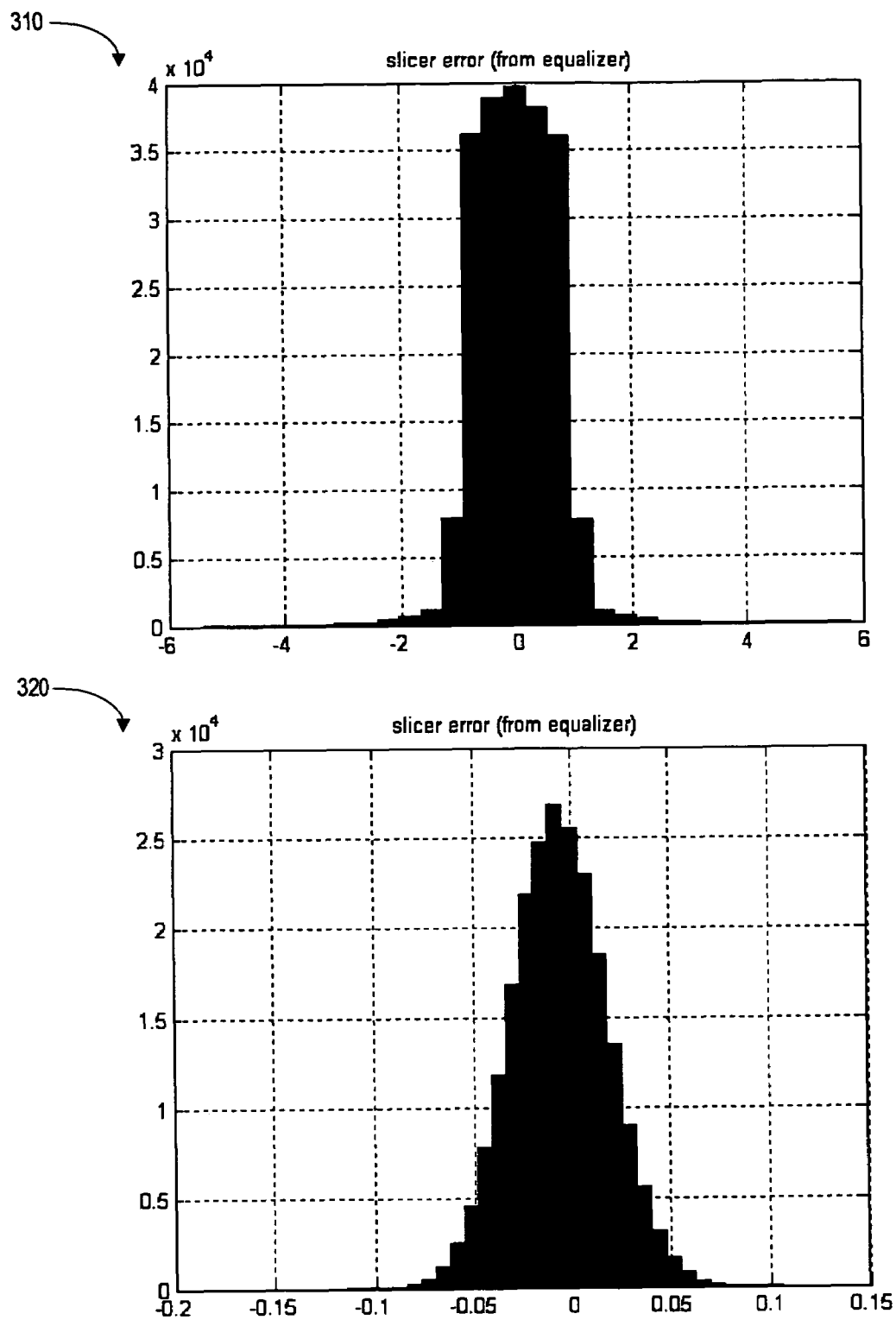
FIG. 3 illustrates a distribution of error associated with an equalizer before and after convergence when there is a relatively small amount of noise according to some embodiments.

According to some embodiments, a distribution of error associated with the equalizer 200 (e.g., a slicer error as described with respect to FIG. 6) is used to determine the mode of operation. For example, FIG. 3 might illustrate a distribution of error (e.g., a histogram) associated with the equalizer 200 before 310 and after 320 convergence when there is a relatively small amount of noise. Note that the statistical distribution of error after convergence 320 has a substantially Gaussian shape.

Figure 4:
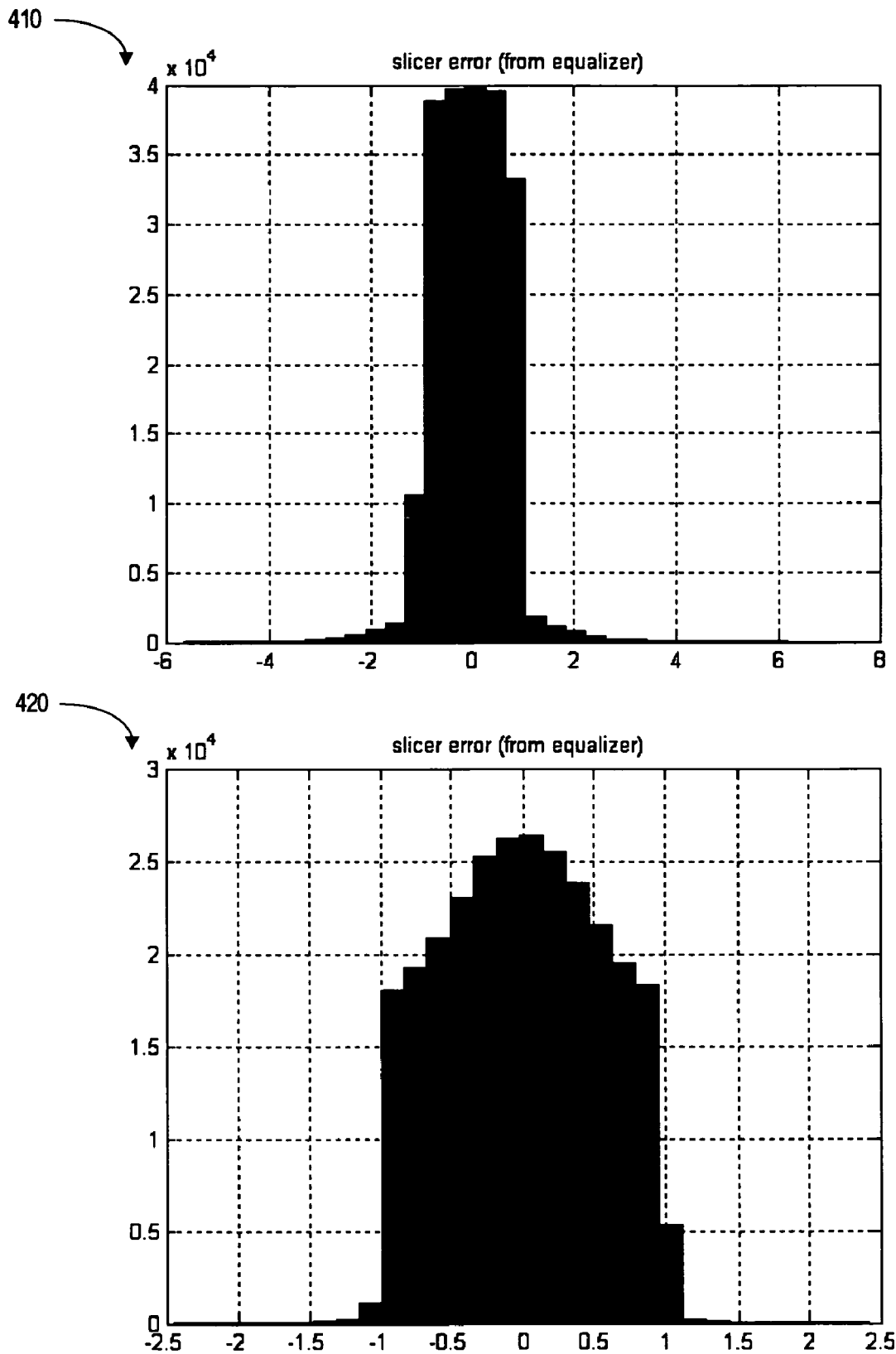
FIG. 4 illustrates a distribution of error associated with an equalizer before and after convergence when there is a relatively large amount of noise according to some embodiments.

Moreover, FIG. 4 might illustrate a distribution of error associated with the equalizer 200 before 410 and after 420 convergence when there is a relatively large amount of noise, such as 15 decibels (dB) of Additive White Gaussian Noise (AWGN). In this case, the statistical distribution of error after convergence 420 also has a substantially Gaussian shape. Thus, according to some embodiments, the shape or distribution of the error 420 is used to determine the mode of operation (even though noise may cause the error 420 to remain fairly large even after convergence).

Figure 5:
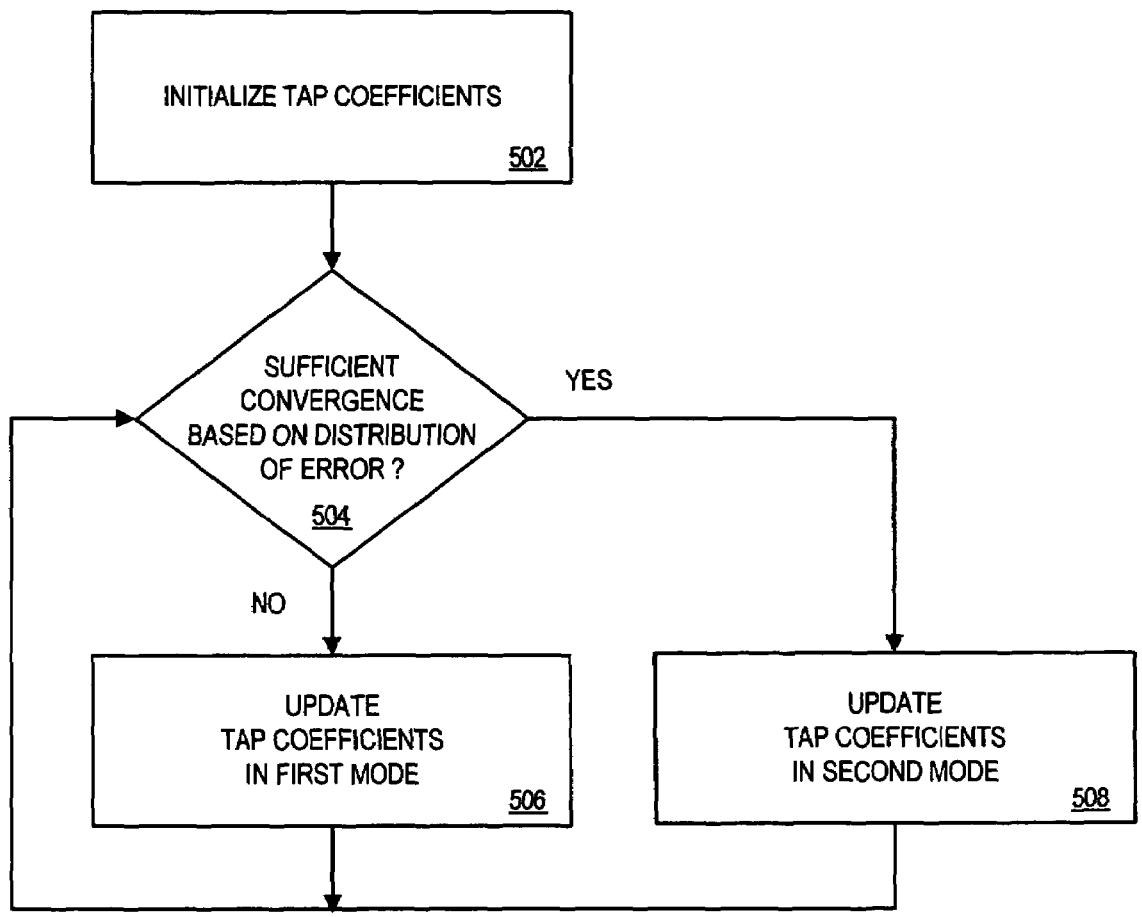
FIG. 5 is a flow chart of a mode selection method according to some embodiments.

FIG. 5 is a flow chart of a mode selection method according to some embodiments. The method might be performed, for example, by a mode controller 260 such as the one described with respect to FIG. 2. The flow chart does not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 502, tap coefficients are initialized. For example, the tap coefficients might be initialized to a default value when an equalizer is turned on or reset. The default value might be, for example, an impulse set (e.g., the coefficient of the center tap might be set to "1" and all other coefficients might be set to "0").

A digital video signal might then be equalized to generate hard symbols, and at 504 the distribution of error associated with the hard symbols is determined. If the distribution of error indicates that sufficient convergence has not been achieved (e.g. the distribution is not approximately Gaussian), the tap coefficients are updated in a first mode at 506 and the process is repeated. After the distribution of error indicates that sufficient convergence has occurred, the tap coefficients are instead updated in a second mode at 508. If the distribution later indicates that convergence has been lost, the equalizer will transition back into the first mode.

Figure 6:
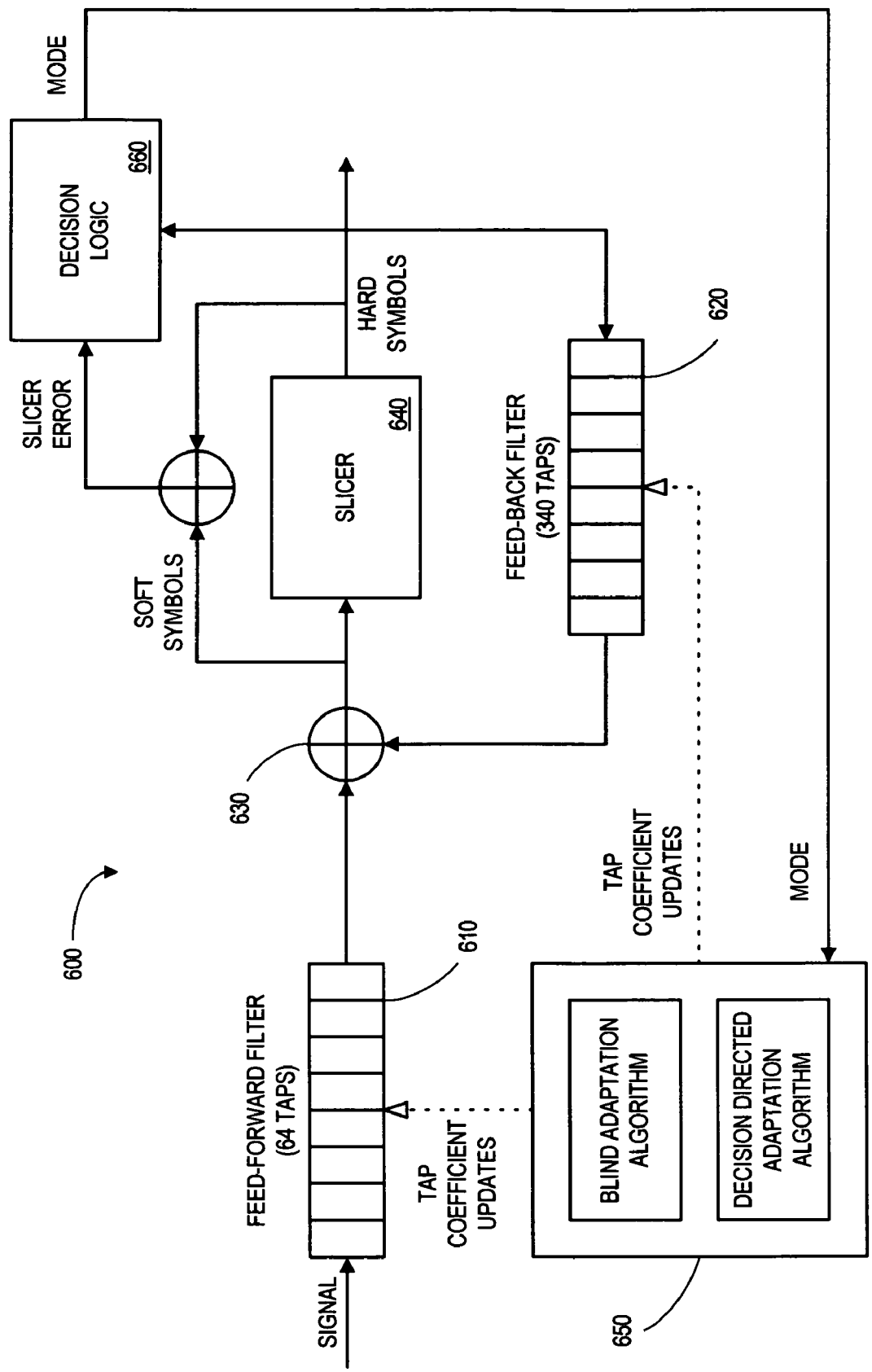
FIG. 6 is a block diagram of an equalizer according to some embodiments.

FIG. 6 is a block diagram of an equalizer 600 according to some embodiments. In particular, the equalizer 600 includes a 64-tap feed-forward filter that receive a terrestrial digital video signal and generates an output. The equalizer 600 also includes a 340-tap feed-back filter that receives hard symbols and generates an output. An updater 650 adjusts the values of the tap coefficients for both filters 610, 620.

A multi-level slicer 640 receives the combined outputs of the feed-forward filter 610 and the feed-back filter 620 (via an adder 630 that provides soft symbols) and generates hard symbols. State machine decision logic 660 may determine a mode of operation associated with the equalizer 600 based on a distribution of the slicer error (e.g., the distribution of the difference between the soft and hard symbols). Although the feed-back filter 620 is shown in FIG. 6 as receiving hard symbols, note that the feed-back filter 620 might, according to some embodiments, receive soft symbols or synchronization information depending on a mode of equalizer 600 operation.

For example, the decision logic 660 may cause the equalizer 600 to operate in a "blind" adaptation mode when the distribution of the slicer error is not approximately Gaussian. The blind adaptation mode, for example, may result in convergence and might not be susceptible to high levels of noise that cause unreliable slicer 640 decisions. The blind adaptation mode may be based on the soft symbols and could be associated with, for example, Sato, Goddard, and/or derived sign error algorithms. However, the blind adaptation mode might have a substantial residual error and may not provide an acceptable Signal-to-Noise Ratio (SNR).

When the distribution of the slicer error becomes approximately Gaussian, the decision logic 660 may cause the equalizer 600 to operate in a "decision directed" adaptation mode. That is, when the equalizer has sufficiently converged (e.g., the decisions of the slicer 640 are reliable enough to approximate likely transmitted symbols), the equalizer 600 may use this information to improve the SNR. The decision directed adaptation mode could be, for example, associated with Minimum Means Square Error (MMSE) and/or Least Mean Square (LMS) algorithms.

Figure 7:
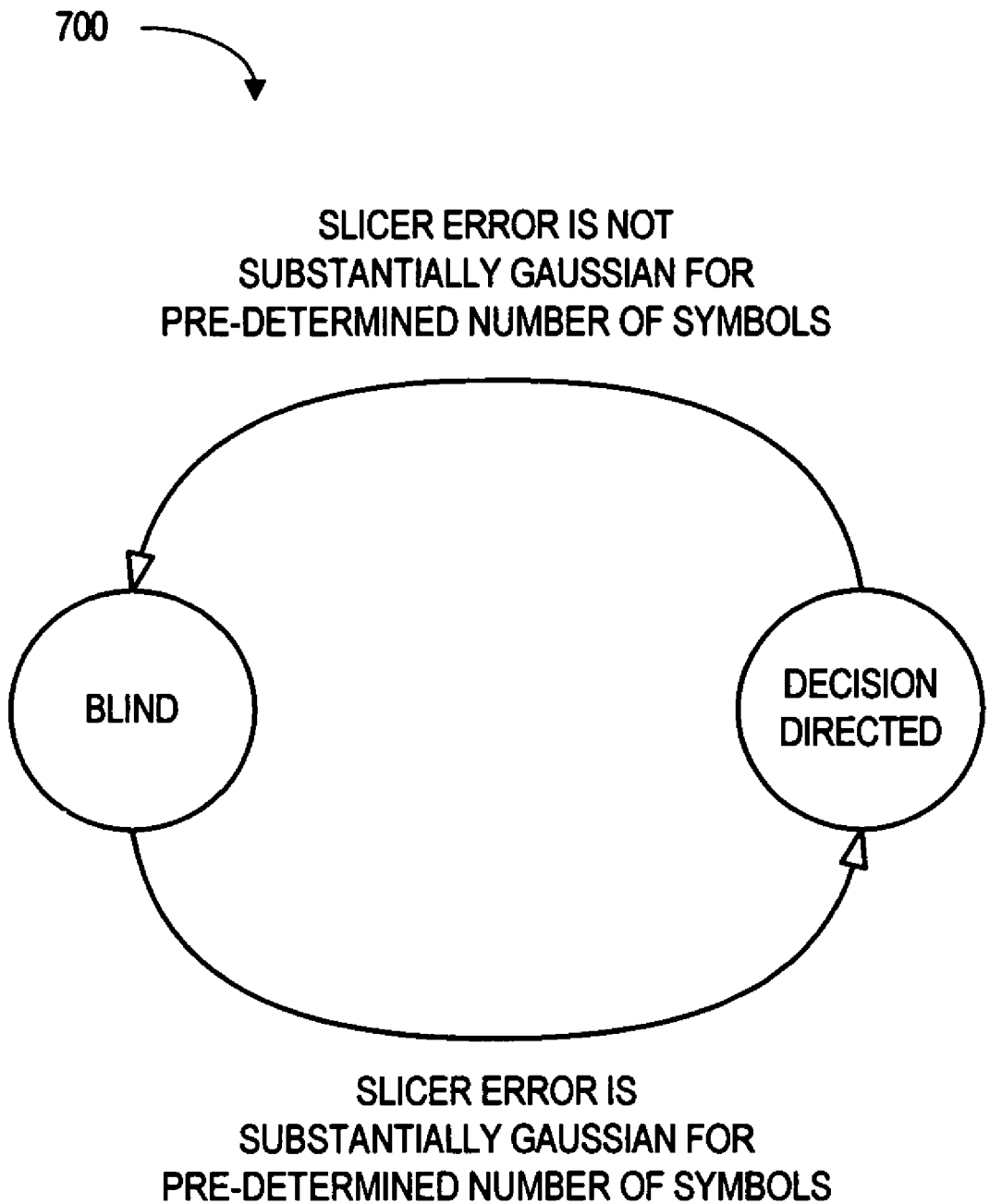
FIG. 7 is a state diagram associated with an equalizer according to some embodiments.

FIG. 7 is a state diagram 700 associated with an equalizer according to some embodiments. In particular, the equalizer may effectively operate in different states or modes by dynamically changing between a blind adaptation and a decision directed adaptation algorithm. The blind adaptation state may be used as a "cold start" to open an eye of a constellation, and once semi-converge is achieved (as evidenced by a substantially Gaussian distribution of slicer error) the equalizer may switch to the decision-directed state in order to improve the MMSE (resulting in a better constellation SNR). When not in a semi-converged state (as evidenced by a non-Gaussian distribution of slicer error), the equalizer may switch back to the blind adaptation state.

Figure 8:
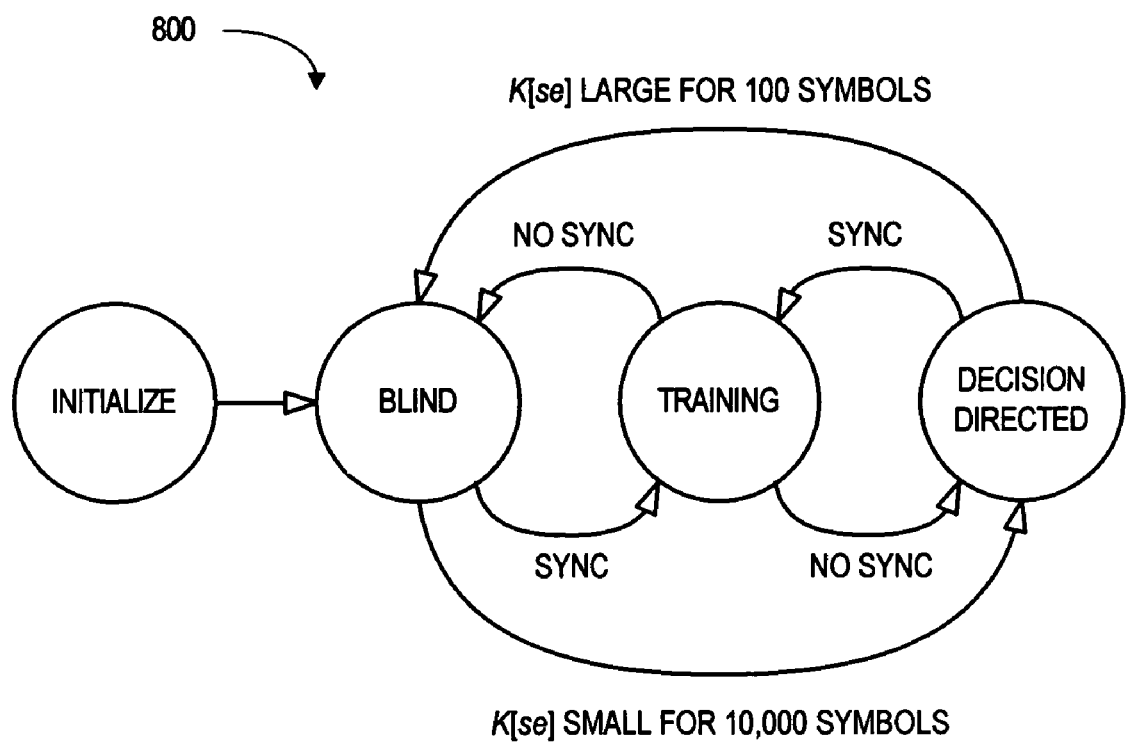
FIG. 8 is a state diagram associated with an equalizer according to another embodiment.

Although two states are illustrated in FIG. 7, an equalizer may also operate in other states. For example, FIG. 8 is a state diagram 800 associated with an equalizer according to another embodiment. In this case, the equalizer begins in an initialization state (e.g., where default tap coefficients are established). A blind adaptation state may then be entered until semi-convergence is achieved. When semi-convergence is achieved, the equalizer switches to a decision directed adaptation state. When in either the blind or decision directed adaptation state, the equalizer may transition into (or out of) a "training" state when synchronization is detected. The training state, for example, may be used when a pre-determined sequence of training symbols are detected by the receiver (and the error may be derived from these training symbols). According to some embodiments, an n-tap correlator is used to detect a sequence of training symbols (where n is associated with the length of a portion of the sequence).

Note that switching between the blind and decision directed adaptation states at an inappropriate time could reduce the performance of the equalizer. For example, remaining in the blind adaptation state too long could delay proper receiver lock and increase the time required to achieve a proper bit error rate. In adverse multipath situations, a desired SNR and/or Threshold Of Visibility (TOV) might not occur at all. Switching to the decision directed adaptation state prematurely, however, might prevent convergence and/ or lead to a poor SNR when noise is present. Similarly, remaining in the decision directed adaptation state when the channel abruptly changes could cause the equalizer to become unstable.

According to some embodiments, a distribution of error associated with the equalizer determine the appropriate time to switch between the blind and decision directed adaptation states. For example, an nth order statistic associated with the error may be used, wherein n is at least 3, to determine whether or not distribution of error is approximately Gaussian. If the distribution is approximately Gaussian, sufficient convergence may have been achieved and, therefore, a transition to the decision directed state may be appropriate.

According to one embodiment, information associated with a 4th order statistic—or kurtosis—is used to determine if the distribution of error is approximately Gaussian. For example, the determination might be based on K[se] and at least one pre-determined threshold, wherein se is associated with the slicer error, E denotes a statistical expectation, and K[se] is defined as $E[se^4]-3(E[se^2])^2$. Note that the kurtosis of a Gaussian process is zero ($K[SE_{Gnoise}]=0$). Moreover, the kurtosis is a linear operator and the kurtosis of the sum is the sum of the kurtosis ($K[SE_{reflection+Gnoise}]=K[SE_{relections}]+K[SE_{Gnoise}]=K[SE_{relections}]+0$). Therefore, the value of the kurtosis of the slicer error may be near zero once the equalizer begins to converge, and non-zero when the equalizer is not converged (whether or not noise is present).

In this case, the equalizer might transition to the blind adaptation mode when K[se] remains below a minimum threshold or above a maximum threshold for a pre-determined period of time (e.g., 100 symbols in FIG. 8). Similarly, the equalizer might transition to the decision directed adaptation mode when K[se] remains above a minimum threshold and below a maximum threshold for a pre-determined period of time (e.g., 10,000 symbols in FIG. 8). Depending on the implementation, the minimum and maximum thresholds might not be symmetrical around zero. For example, K[se] might be considered "small" if it remains between −0.4 and 0.2.

Figure 9:
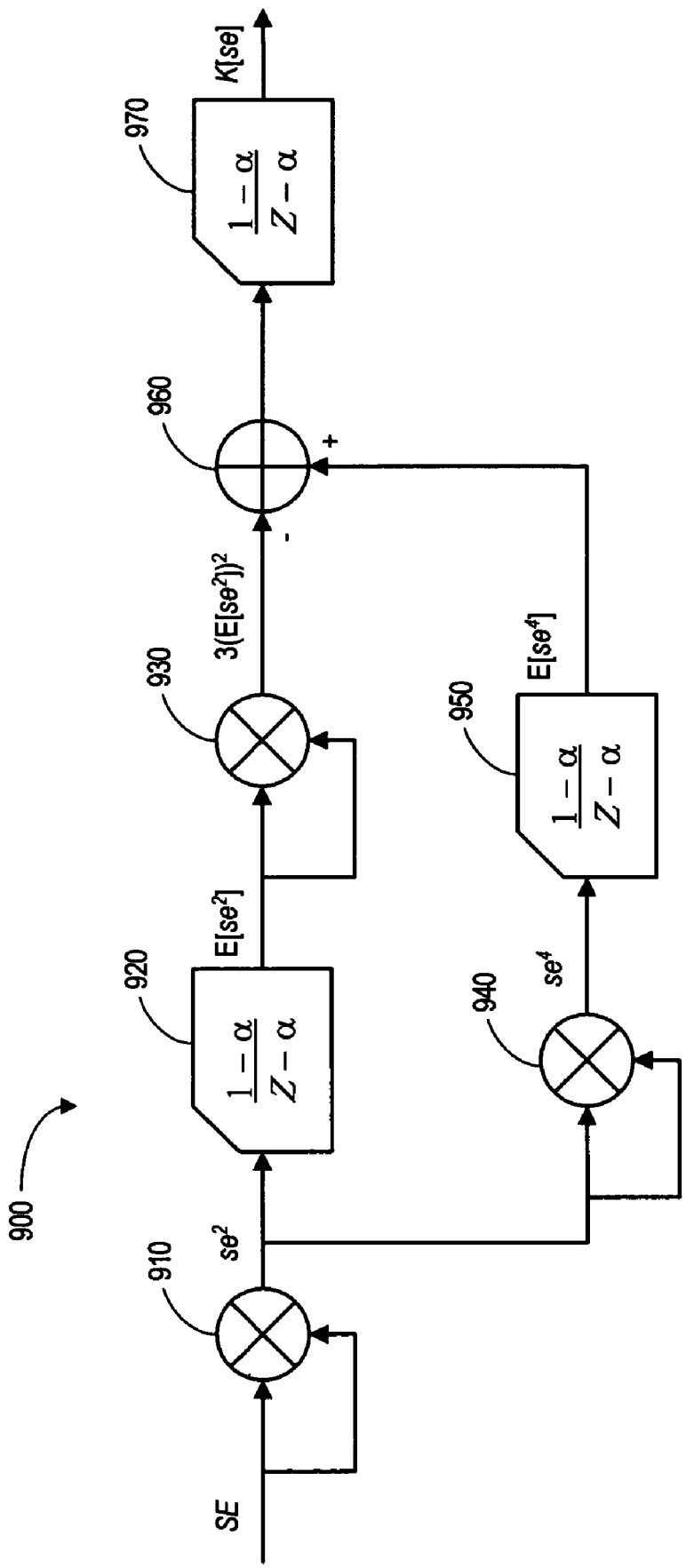
FIG. 9 is a block diagram of a circuit to approximate a 4th order statistic according to some embodiments.

The kurtosis might be computed using statistical averaging. According to some embodiments, the kurtosis is approximated using time averaging instead. For example, FIG. 9 is a block diagram of a circuit 900 to approximate a 4th order statistic using autoregressive filters according to some embodiments. In particular, a multiplier 910 multiplies SE by itself and generates $se^2$, and a digital filter 920 generates $E[se^2]$ using long term averaging. Another multiplier 930 can then generate $3(E[se^2])^2$. Still another multiplier 940 receives $se^2$ and generates $se^4$, and another digital filter 950 provides $E[se^4]$. An adder 960 may, for example, combine a negative $3(E[se^2])^2$ and a positive $E[se^4]$, and a third digital filter 970 outputs K[se].

Figure 10:
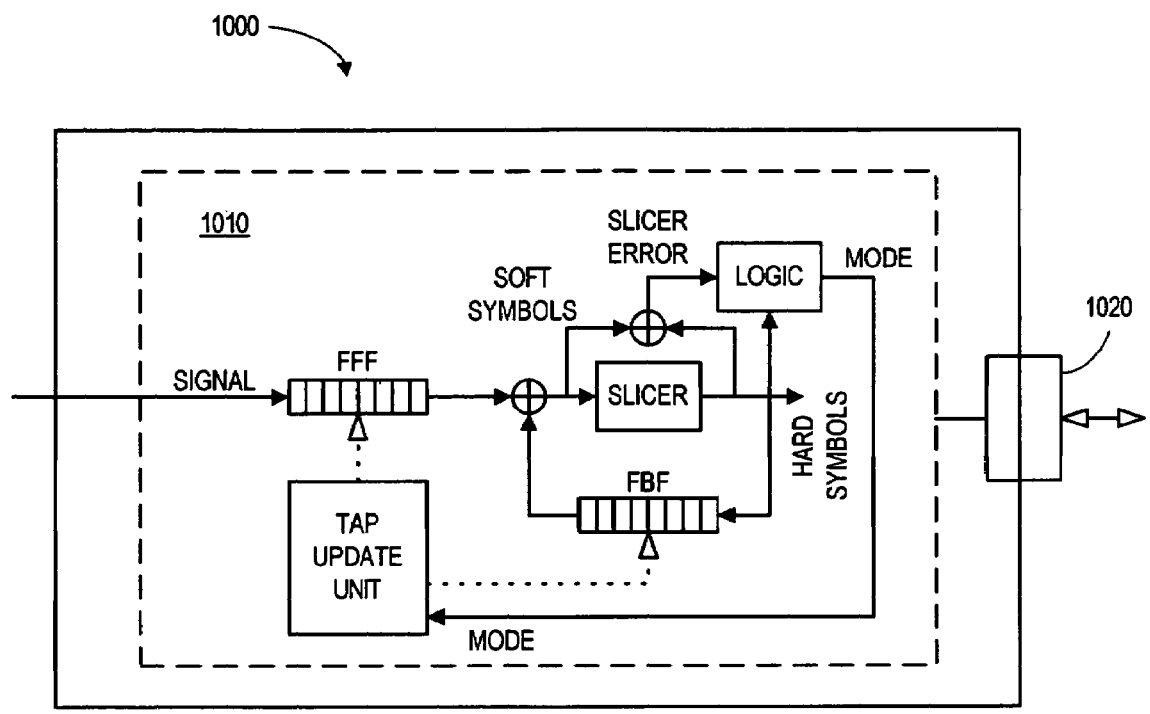
FIG. 10 is a block diagram of a system according to some embodiments.

In this way, a robust and effective equalizer may be provided even when high noise levels and/or echoes are present in a signal. Moreover, convergence of the equalizer may be achieved, and an acceptable SNR value may be obtained. Such an equalizer might be used, for example, in a system 1000 such as the one illustrated in FIG. 10. The system 1000 might be associated with, for example, a set-top box and may include an equalizer 1010 to receive a signal and to generate hard symbols based on the received signal. The equalizer may 1010 operate in accordance with any of the embodiments described herein. For example, the equalizer 1010 might include a controller (e.g., logic) that determines a mode of operation (e.g., blind or decision directed adaptation modes) based at least in part on a distribution of error. According to some embodiments, the system 1000 further includes a digital video output port 1020 to provide information associated with the hard symbols to an external device (e.g., to a high-definition television).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

For example, although a particular design for a circuit to approximate a 4th order statistic has been described herein, other designs may be used according to other embodiments. Similarly, other order statistics may be used to estimate a distribution of error associated with a slicer. In addition, note that any embodiments may be associated with, for example, an equalizer output associated with either hard or soft symbols.

Figure 11:
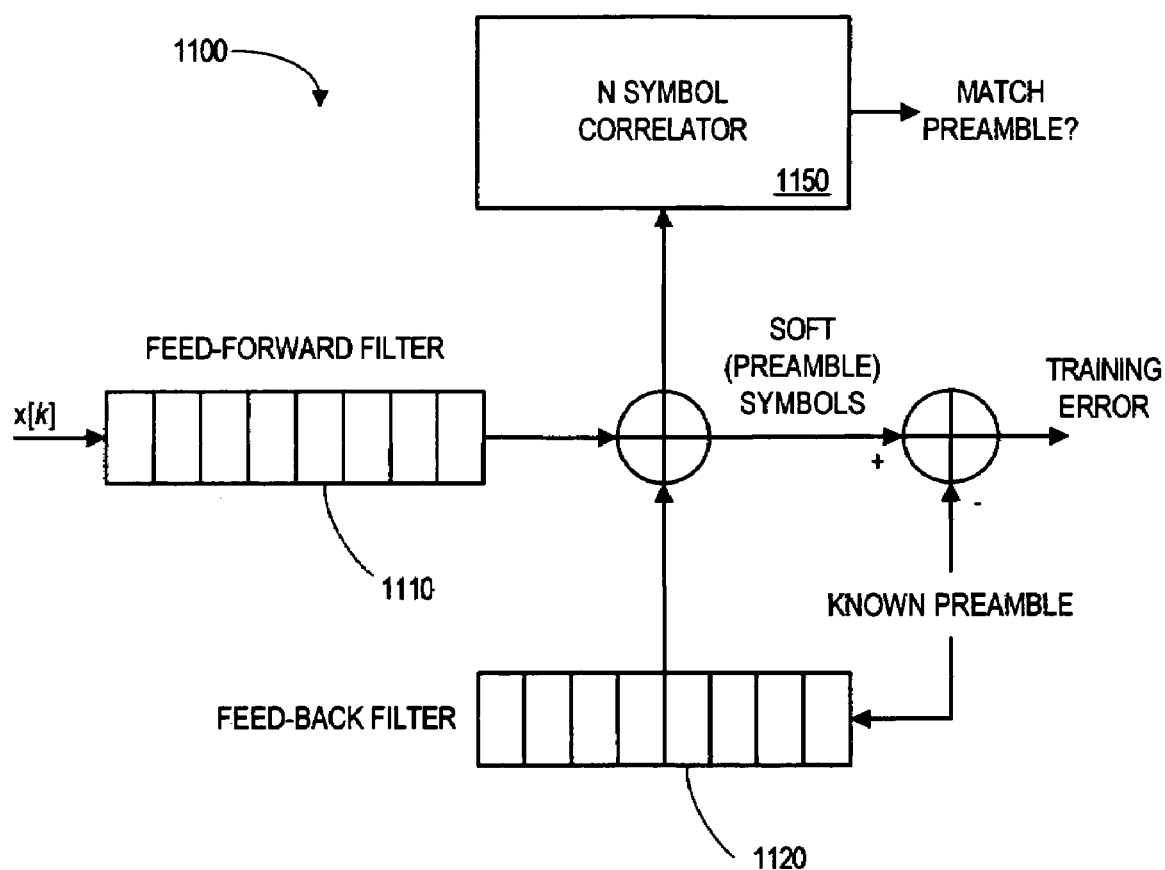
FIG. 11 is a block diagram of an apparatus associated with a training error according to some embodiments.

Moreover, some embodiments have been described with respect to a distribution of slicer error, embodiments might be associated with other types of errors. For example, FIG. 11 is a block diagram of an apparatus 1100 associated with a training error according to some embodiments. In this embodiment, an N-symbol synchronization correlator 1150 may be used to detect the training sequence, with N representing a partial length of the known sequence (e.g., N might equal 64 for a 511 symbol training sequence). According to some embodiments, the correlator 1150 may be placed after a feed-forward filter 1110 and feed-back filter 1120 (e.g. the soft symbols coming out of the filters 1110, 1120 may be fed through the correlator 1150). When the first N symbols or "preamble" is detected, the remaining symbols of the sequence may be used to adapt the coefficients of the feed-back filter 1120 (e.g., in a LMS fashion) based on a training error. The training error might represent, for example, an error between the soft symbols and the expected training sequence symbols. Note that this training error might exhibit similar characteristics as the slicer error, and could therefore help determine when the apparatus 1100 has reached an appropriate point of convergence.

The several embodiments described herein are solely for the purpose of illustration. Persons skilled in the art will recognize from this description other embodiments may be practiced with modifications and alterations limited only by the claims.

What is claimed is:

1. An apparatus, comprising:
   a decision unit to generate symbols;
   a mode controller to determine a mode of operation based at least in part on a distribution of error associated with the symbols; and
   a filter associated with tap coefficients, wherein the tap coefficients are to be updated in a first adaptation mode when the distribution of error is not approximately Gaussian and a second adaptation mode when the distribution of error is approximately Gaussian.

2. The apparatus of claim 1, wherein the error is associated with the symbols and a set of training mode symbols.

3. The apparatus of claim 1, wherein the decision unit is to generate hard symbols and the distribution of error is associated with the hard symbols.

4. The apparatus of claim 1, wherein the mode controller determines if the distribution of error is not approximately Gaussian using information associated with a 4th order statistic.

5. The apparatus of claim 4, wherein the mode controller approximates the 4th order statistic using autoregressive filters.

6. The apparatus of claim 1, wherein the decision unit is to generate hard symbols, the distribution of error is associated with the hard symbols, and the filter includes:
- a feed-forward filter having a plurality of taps, each tap being associated with a coefficient, wherein the feed-forward filter is to receive a signal and to generate an output; and
- a feed-back filter having a plurality of taps, each tap being associated with a coefficient, wherein the feed-back filter is to receive the hard symbols and to generate an output; and farther comprising:
- a slicer to receive the combined outputs of the feed-forward filter and the feed-back filter and to generate the hard symbols.

7. The apparatus of claim 6, wherein the coefficients are updated in a blind adaptation mode when the distribution of slicer error is not approximately Gaussian.

8. The apparatus of claim 7, wherein the mode controller determines that the distribution of slicer error is not approximately Gaussian based on K[se] and at least one pre-determined threshold, wherein se is associated with the slicer error, E denotes a statistical expectation, and K[se] is defined as $E[se^4]-3(E[se^2])^2$.

9. The apparatus of claim 8, wherein the mode controller determines that the equalizer will transition to the blind adaptation mode when K[se] remains below a minimum threshold or above a maximum threshold for a pre-determined number of symbols.

10. The apparatus of claim 8, wherein the mode controller determines that the equalizer will transition to a decision directed adaptation mode when K[se] remains above a minimum threshold and below a maximum threshold for a pre-determined number of symbols.

11. The apparatus of claim 6, wherein the slicer is a vestigial side band multi-level slicer.

12. The apparatus of claim 1, wherein the mode controller determines a training mode of operation for an equalizer when training symbols are detected.

13. The apparatus of claim 1, wherein the apparatus is associated with at least one of: (i) a receiver, (ii) a digital video broadcast receiver, (iii) a television, (iv) a set-top box, (v) a digital video recorder, or (vi) a media center.

14. A method, comprising:
- equalizing a digital video signal to generate symbols;
- updating filter tap coefficients associated with said equalizing in a first mode;
- determining that sufficient convergence has occurred based on a distribution of error associated with the symbols becoming approximately Gaussian; and
- based on the determination, updating the coefficients in a second mode.

15. The method of claim 14, wherein the first mode is a blind adaptation mode and the second mode is associated with a least mean square algorithm.

16. The method of claim 14, further comprising:
- initializing the coefficients prior to said equalizing.

17. The method of claim 14, further comprising:
- detecting training symbols in the digital video signal; and
- based on the detection, updating the coefficients in a third mode.

18. The method of claim 14, further comprising:
- determining that sufficient convergence has been lost based on the distribution of error associated with the symbols becoming not approximately Gaussian; and
- based on the determination, updating the coefficients in the first mode.

19. An apparatus, comprising:
- a feed-forward filter having a plurality of taps, each tap being associated with a coefficient, wherein the feed-forward filter is to receive a terrestrial digital video signal and to generate an output;
- a feed-back filter having a plurality of taps, each tap being associated with a coefficient, wherein the feed-back filter is to receive symbols and to generate an output;
- a multi-level slicer to receive the combined outputs of the feed-forward filter and the feed-back filter and to generate the symbols; and
- state machine logic to arrange for the coefficients to be updated in accordance with one of a plurality of algorithms based on a distribution of error associated with the slicer, wherein the state machine logic estimates an nth order statistic associated with the error, wherein n is at least 3.

20. The apparatus of claim 19, wherein the state machine logic is associated with at least one of: (i) an initialization state, (ii) a blind adaptation state, (iii) a decision directed adaptation state, or (iv) a training state.

21. A system, comprising:
- a slicer;
- a controller to determine a mode of equalizer operation based at least in part on a distribution of error associated with the slicer, wherein tap coefficients are updated in a blind adaptation mode when K[se] remains below a minimum threshold or above a maximum threshold for a pre-determined number of symbols, where se is associated with the error, E denotes a statistical expectation, and K[se] is defined as $E[se^4]-3(E[se^2])^2$; and
- a digital video output port to provide to an external device information associated with hard symbols generated by the slicer.

22. The system of claim 21, wherein the system is associated with at least one of: (i) a receiver, (ii) a digital video broadcast receiver, (iii) a television, (iv) a set-top box, (v) a digital video recorder, or (vi) a media center.

* * * * *